United States Patent
Abdelwahab et al.

(10) Patent No.: US 12,397,995 B2
(45) Date of Patent: Aug. 26, 2025

(54) APPARATUS FOR MOVING OBJECTS AND RELATIVE MOVEMENT METHOD

(71) Applicant: FIVES INTRALOGISTICS S.P.A., Lonate Pozzolo (IT)

(72) Inventors: Essam Alaaeldin Ali Ahmed Abdelwahab, Samarate (IT); Carmine Filella, Cavaria Con Premezzo (IT)

(73) Assignee: FIVES INTRALOGISTICS S.P.A., Lonate Pozzolo (IT)

( * ) Notice: Subject to any disclaimer, the term of this patent is extended or adjusted under 35 U.S.C. 154(b) by 247 days.

(21) Appl. No.: 18/184,378

(22) Filed: Mar. 15, 2023

(65) Prior Publication Data

US 2023/0294922 A1    Sep. 21, 2023

(30) Foreign Application Priority Data

Mar. 18, 2022   (IT) .......................... 102022000005318

(51) Int. Cl.
*B65G 13/04*    (2006.01)
*B65G 47/22*    (2006.01)

(52) U.S. Cl.
CPC ............. *B65G 13/04* (2013.01); *B65G 47/22* (2013.01); *B65G 2203/0233* (2013.01); *B65G 2203/025* (2013.01); *B65G 2207/34* (2013.01)

(58) Field of Classification Search
CPC ................................ B65G 13/04; B65G 47/22
(Continued)

(56) References Cited

U.S. PATENT DOCUMENTS 4,852,721 A * 8/1989 Stille ..................... B65G 39/025
198/782
5,346,053 A * 9/1994 Dorn ..................... B07B 1/4645
198/405
(Continued)

FOREIGN PATENT DOCUMENTS

DE    102010015584 A1 * 10/2011 ........... B65G 1/0478
DE    10 2016 107665       10/2017
(Continued)

OTHER PUBLICATIONS

US 2008/0169171 A1, Itoh et al., Jul. 17, 2008.*
Italian Search Report and Written Opinion, issued Oct. 31, 2022.

*Primary Examiner* — Douglas A Hess
(74) *Attorney, Agent, or Firm* — Chrisman Gallo Tochtrop LLC (57) ABSTRACT

A movement apparatus for objects configured for receiving an object from an infeed station and moving the object towards an outfeed station, comprising a movement surface comprising movement cells positioned on in a matrix fashion, positioned to operate with the object, wherein each movement cell has a direction of movement which can be individually controlled; a control system configured for defining a conveying trajectory in the movement surface for conveying the object from the infeed to the outfeed station; identifying trajectory cells belonging to the conveying trajectory and directing the direction of movement of each trajectory cell to move the object in the conveying trajectory; identifying, between the movement cells, convergence cells, defining a convergence zone adjacent to the conveying trajectory and, for each convergence cell, directing the direction of movement towards a central line of the conveying trajectory to maintain of the object inside the conveying trajectory.

7 Claims, 3 Drawing Sheets

(58) Field of Classification Search
USPC .................................................. 198/412, 782
See application file for complete search history.

(56) References Cited

U.S. PATENT DOCUMENTS

| | | | |
|---|---|---|---|
| 6,889,815 B2 | 5/2005 | Kanamori et al. | |
| 7,896,150 B2* | 3/2011 | Smalley | B65G 43/08 198/370.03 |
| 8,978,879 B2* | 3/2015 | Fourney | B65G 47/54 198/782 |
| 9,022,208 B2* | 5/2015 | Huber | B64D 9/00 198/781.05 |
| 9,630,781 B1* | 4/2017 | Ogle | B65G 47/53 |
| 10,493,927 B1* | 12/2019 | Widmer | H02G 3/34 |
| 10,577,189 B2 | 3/2020 | Itoh et al. | |
| 10,853,600 B2* | 12/2020 | Tachibana | B65G 47/493 |
| 11,225,382 B2* | 1/2022 | Aschpurwis | B65G 39/025 |
| 11,319,155 B2* | 5/2022 | Huang | B65G 13/065 |
| 2003/0234155 A1 | 12/2003 | Kanamori et al. | |
| 2008/0169171 A1 | 7/2008 | Itoh et al. | |
| 2018/0111767 A1 | 4/2018 | Itoh | |

FOREIGN PATENT DOCUMENTS

| | | | |
|---|---|---|---|
| EP | 1375389 | 1/2004 | |
| EP | 1947035 | 7/2008 | |
| EP | 3315436 | 5/2018 | |
| EP | 3357839 | 8/2018 | |
| EP | 3733567 A1 * | 11/2020 | B65G 13/04 |
| WO | WO-2012101576 A2 * | 8/2012 | B65G 17/24 |

* cited by examiner

APPARATUS FOR MOVING OBJECTS AND RELATIVE MOVEMENT METHOD

This invention relates to an apparatus for moving objects and a relative method for moving objects.

In particular, the invention relates to the technical sector of the systems for moving objects, for the purposes of storage, or sorting of the objects, for example logistics systems, or transport systems.

The term "object" is used to mean, in this text, a package, an item of luggage, or a bag, of any shape, weight and size, which is processed in the above-mentioned movement systems and which is therefore moved by a movement apparatus between an infeed station to an outfeed station, in order to transfer, sort it, or orient it according to a preferred direction.

Traditionally, these movement systems comprise a main conveyor, a movement apparatus, and one or more secondary conveyors, wherein the main conveyor moves the objects to be moved and/or sorted along a main path up to the movement apparatus, and the movement apparatus, to which the various secondary conveyors are connected according to predetermined criteria, moves each object to the desired secondary conveyor for transferring the object by means of the secondary conveyor to a relative distribution station.

Solutions of a different type for the movement apparatuses have been developed over the years to allow the objects to leave the main conveyor and diverge along their path towards the secondary conveyor.

One of these solutions involves the use of special carriages which move the object, typically a pack, along the main conveyor and are equipped with laterally oriented rollers which are actuated at the correct moment for directing the pack towards the desired secondary conveyor.

Another solution comprises the use of units movable above the main conveyor and configured for making contact with or engaging laterally the packs for directing them towards the secondary conveyors.

To allow a more complete and/or precise control of the position and movement parameters of the objects, movement apparatuses have recently been widespread on the market comprising a modular movement surface having a plurality of movement cells, preferably identical to each other, arranged in a matrix or chequerboard fashion on the movement surface, which are configured to operate in conjunction with each other in such a way as to move in succession objects from one, or more, infeed stations to one, or more, outfeed stations. In particular, each movement cell has a direction of movement which can be controlled independently from the other movement cells.

An example of these movement apparatuses is shown in European patent application No. EP1375389A1 which shows a transport apparatus provided with a transport surface having a plurality of conveying portions configured for making an object slide sequentially on the conveying surface. Each of these conveying portions comprises a pair of rollers parallel to each other having respective axes of rotation parallel to the conveying surface, defining a conveying direction perpendicular to the axis of rotation of the rollers. The rollers are mounted on a base, rotatable about a vertical axis relative to the conveying surface, in such a way as to vary the direction of movement of the rollers.

By means of these movement apparatuses for objects, it is advantageously possible to arbitrarily move an object on the movement surface even in the absence of mechanical components which engage on the object, to direct the object in the desired direction.

A system for controlling the movement apparatus is typically provided to define, for each object to be moved in the movement surface, a conveying trajectory from an infeed station of the object to an outfeed station of the object. For this purpose, the control system is configured for identifying, between the movement cells, trajectory cells belonging to the conveying trajectory and directing, in use, the direction of movement of each trajectory cell in the movement surface in such a way as to move the object in the conveying trajectory.

When, on the movement surface, there are two or more objects, for each one a respective conveying trajectory, an infeed station and an outfeed station is defined, in such a way that each object is moved independently from the other object, or from the other objects.

Due to the slipping between the object to be moved and the movement cells, or due to impacts between any objects present simultaneously on the movement surface, it may happen that the object loses the conveying trajectory defined for it and moves in the movement surface in an uncontrolled manner.

In this case, each object may not only not reach the relative outfeed station, but may also fall outside the movement surface, with the risk of damaging itself.

Document EP3315436 A1 relates to a device for transporting articles which is able to perform a transfer operation and a rotation operation. The conveying device has a transfer part having a belt to allow the positioning of an article, and a turntable which supports the transfer part. The belt is a continuous element suspended between a pair of rollers which slide being engaged by a transfer motor whilst a rotation motor engages with the turntable.

In this context, the technical purpose which forms the basis of this invention is to provide an apparatus for moving objects, and the relative movement method, which overcomes at least some of the above-mentioned drawbacks of the prior art.

A further aim of the invention is to provide an apparatus for moving objects, and the relative movement method, comprising a modular movement surface having a plurality of movement cells, preferably identical to each other, arranged in a matrix or chequerboard fashion on the movement surface, configured to operate in conjunction with each other in such a way as to move in succession at least one object from an infeed station to an outfeed station, which promotes a maintaining of the object inside a conveying trajectory defined for the object.

Another aim of the invention is to provide an apparatus for moving objects, and the relative movement method, which is able to increase a reliability of movement of each object inside the conveying trajectory.

The technical purpose indicated and the aims specified are substantially achieved by an apparatus for moving objects and by the relative movement method, comprising the technical features described in one or more of the appended claims.

The dependent claims correspond to possible embodiments of the invention.

Further features and advantages of the invention are more apparent in the non-limiting description which follows of a preferred non-limiting embodiment of a movement apparatus for objects and a relative method for moving objects.

The description is set out below with reference to the accompanying drawings which are provided solely for purposes of illustration without restricting the scope of the invention and in which.

With reference to the accompanying drawings, the numeral 1 generically denotes an apparatus for moving objects 2.

The movement apparatus 1 is configured to receive at least one object 2 from one, or more, infeed stations 3 and move the object 2 towards one, or more, outfeed stations 4.

Figure 3:
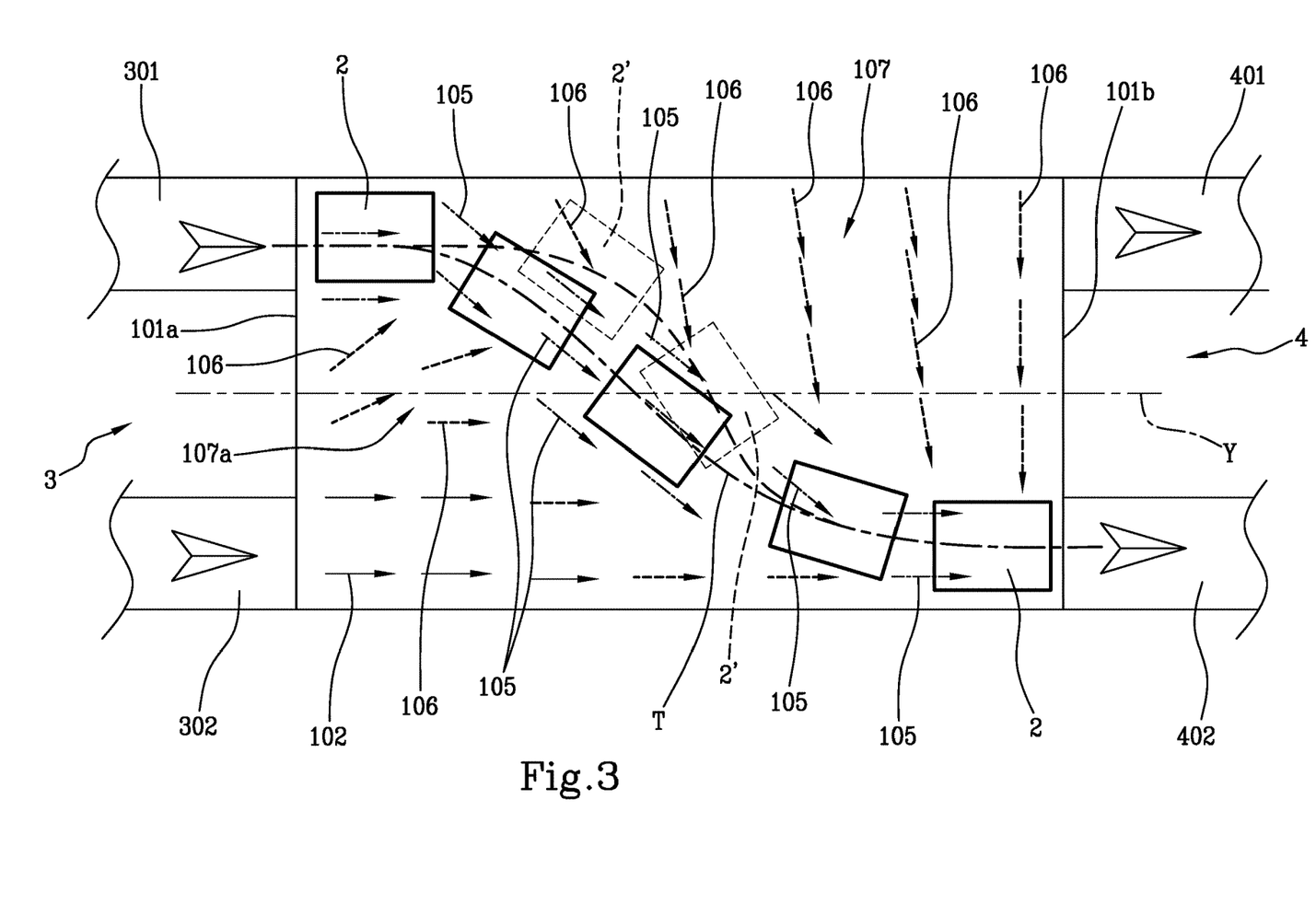
FIG. 3 shows a schematic view of the movement apparatus of FIG. 1, in use, when on the movement apparatus there is an object moved from an infeed station to an outfeed station on a conveying trajectory defined on the movement surface, wherein the object is shown in successive positions on the conveying trajectory and there is an action for disturbing the object such as to make it come out from the conveying trajectory.

It should be noted that FIG. 3 shows, purely by way of example, two infeed stations, 301 and 302 and two outfeed stations 401, and 402 of the plurality of infeed stations 3, and possible outfeed stations 4.

Preferably, the movement apparatus 1 is configured to receive several objects to be moved simultaneously from one or more of the infeed stations 3 to one or more of the outfeed stations 4 but, for simplicity, the presence of a single object in the movement apparatus 1 will be considered below.

The movement apparatus 1 comprises a movement surface 101 comprising a plurality of movement cells 102 positioned on it in a matrix or chequerboard fashion, which are configured and positioned to operate in conjunction with each other and move the object 2 in succession.

The object 2 is placed on the movement surface 101 in such a way that a relative lower surface (not illustrated) is resting on it.

Figure 1:
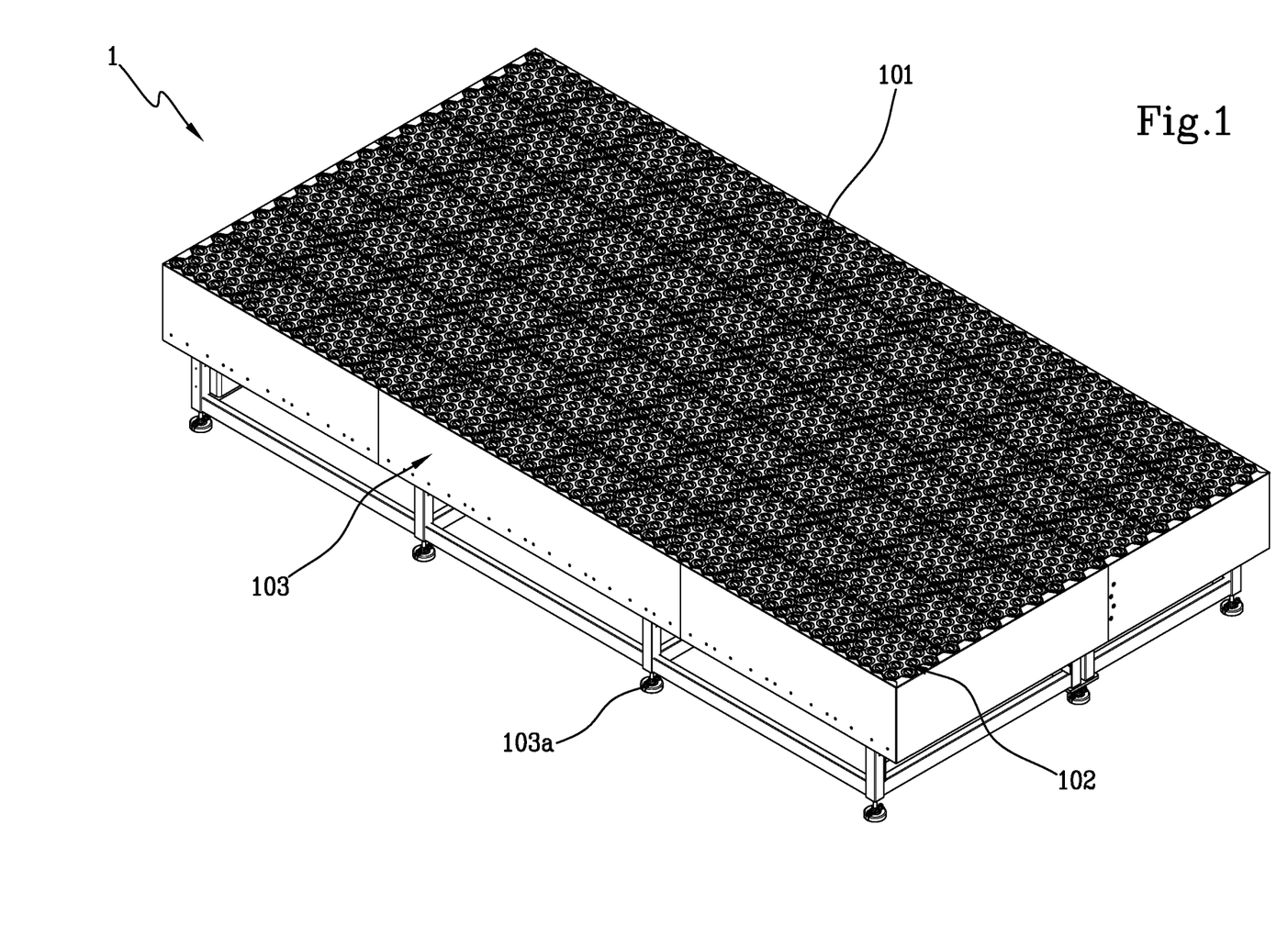
FIG. 1 shows a perspective view of an apparatus for moving objects made according to the invention, comprising a movement surface provided with a plurality of movement cells positioned on it in a matrix or chequerboard fashion, configured and arranged to operate in conjunction with each other and move in succession an object.

The movement apparatus 1 comprises a frame 103, provided with respective feet 103a configured to allow the movement apparatus 1 to be placed on the floor (not illustrated) of a movement system of the logistics, or transport, sector, in which the movement apparatus 1 can be installed. The movement apparatus 1 is shown in its entirety in FIG. 1.

Figure 2:
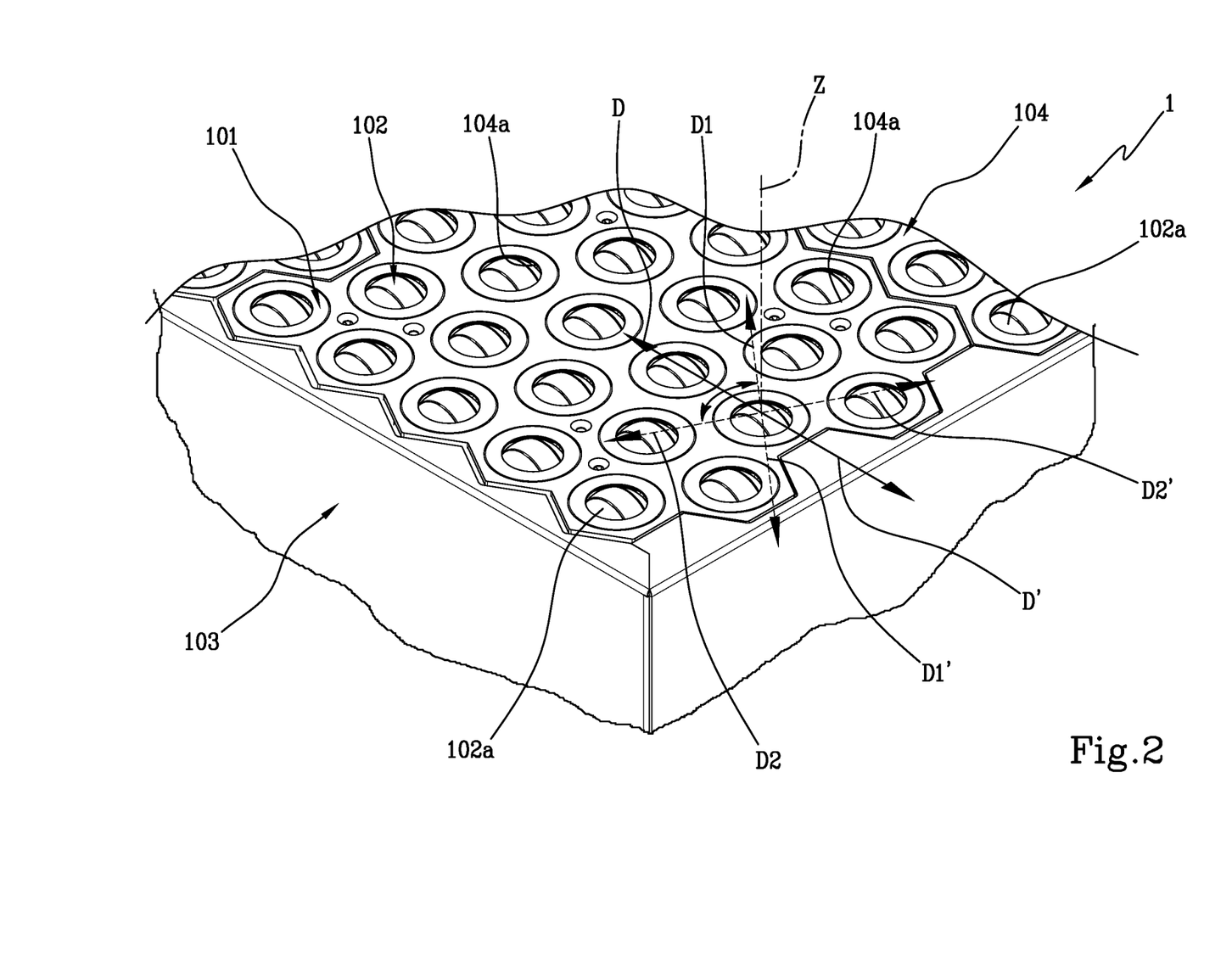
FIG. 2 is an enlarged view of a detail shown in FIG. 1.

The frame 103 comprises a supporting mask 104, provided with holes 104a, and is configured to support each movement cell 102 and to ensure that an element for moving the cell, shaped like a ball 102a, can come out from the respective hole 104a, to allow the movement of the object 2, as shown in more detail in FIG. 2.

In fact, each movement cell 102 comprises a tubular supporting body (not illustrated) having an axis Z, which is positioned vertically, at the end of which is rotatably fixed the ball 102a.

The ball 102a is rotatable about a horizontal axis, not illustrated, parallel to the movement surface 101 and perpendicular to the vertical axis, which, in use, defines a direction of movement D of the movement cell 102.

It should be noted that the ball 102a is rotatable in a clockwise or anticlockwise direction, to allow a different direction of movement D' to be obtained, modified by 180° relative to the direction of movement D, that is to say, a direction of movement in the opposite direction.

In detail, the direction of movement D of each movement cell 102 is perpendicular to the horizontal axis about which the ball 102a, in use, rotates.

The ball 102a is also rotatable relative to the vertical axis Z of the supporting body, so as to be able to vary the direction of movement D of the movement cell 102. By way of example, FIG. 2 shows a further direction of movement D1, and another direction of movement D2, as well as the corresponding directions of movement D1' and D2' in the opposite direction.

For this reason, each movement cell 102 may have, in use, a respective direction of movement D and, in the direction of movement D, a respective movement speed.

The movement speed derives directly from the speed of rotation of the ball 102a about the horizontal axis.

Each movement cell 102 is individually controllable, in the sense that the direction of movement D and the relative movement speed of each movement cell 102 can be controlled independently from the other movement cells 102 forming part of the movement surface 101.

In fact, each movement cell 102 comprises a pair of actuators, not illustrated, which are independent of each other and independently controllable, which respectively control the rotation of the ball 102a about the vertical axis Z (and that is, the direction of movement of the movement cell 102) and the rotation of the ball 102a about the horizontal axis (and that is, the movement speed of the movement cell 102), as schematically shown in FIG. 2.

A movement cell 102 and a movement surface 101 as described here are illustrated in detail in European patent application No. EP3643644 of the same Applicant, to which reference is made without limiting the scope of the invention.

It should be noted, however, that the object of the invention, as described here, is also applicable to a movement surface 101 provided with movement cells of a different type, for example having two movement rollers, as described in the European patent application EP1375389A1 mentioned above as forming part of the prior art since, also in that case, each movement cell has a direction of movement and a respective movement speed which can be individually controlled.

As mentioned above, said movement cells 102 are configured and positioned to operate in conjunction with each other and move an object 2 in succession.

In fact, since the movement cells 102 are individually controllable, when the object 2 is rested on the movement surface 101, the direction and movement speed of each movement cell 102 may be coordinated with the direction and speed of the movement cells 102 adjacent to it to ensure that the object 2 is transferred to a predetermined position of the movement surface 101.

In this way, advantageously, the movement surface 101 may be suitable for objects and packs of different dimensions, weights and features, to perform movements of different types, as described below.

The movement apparatus 1 comprises a control system (not illustrated) configured to define a conveying trajectory in the movement surface 101, for moving the object 2 from an infeed station 3 to an outfeed station 4.

It should be noted that, in general, the control system may be divided into separate functional modules, which may correspond to hardware units and/or software routines, and may consist of a single electronic device, suitably programmed to perform the functions described, for example a control PLC, or a control PC. In this case, the various functional modules can form part of the programmed device. Alternatively or in addition, the control system can comprise a plurality of electronic devices on which the above-mentioned functional modules can be distributed. In fact, the control system may have one or more processors for the execution of the functional modules, which may be distributed on different control PLCs, or different control PCs, locally, or remotely (for example, in the cloud), on the basis of the architecture of the communication network on which they reside.

The term "control system" is used to comprise all the components necessary for implementing the control system, for example the electronic devices and/or hardware units and/or software routines and/or the memory modules and/or the communication network mentioned above.

The control system is also connected to each movement cell 102, for controlling the pair of actuators defining the direction of movement D and the movement speed of each movement cell 102.

As shown in FIG. 3, the movement apparatus 1 may have the two infeed stations 301 and 302 and the two outfeed stations 401, and 402.

It should be noted that the infeed stations 3 and the outfeed stations 4 may be perimetrically distributed on a movement surface 101 and, usually, considering a longitudinal axis of extension Y of the movement surface, are positioned on an infeed side 101a and an outfeed side 101b, which are facing each other.

In the case illustrated, the movement surface 101 has a rectangular shape and, therefore, the infeed side 101a and the outfeed side 101b are short sides of the rectangle, facing each other.

However, it is not necessary for the movement surface 101 to be rectangular because it may also have a different shape relative to the need for positioning the infeed stations 3, and/or the outfeed stations 4 in the system in which the movement apparatus 1 is to be positioned.

In fact, the same perimeter position of each infeed station 3, and of each outfeed station 4, relates to the specific need of the system.

For example, the conveying trajectory may be linear, for linearly moving the object 2 between an infeed station 3 and an outfeed station 4, positioned aligned with each other.

The conveying trajectory may also be crossed, as shown in FIG. 3, for moving the object diagonally between an infeed station 3, for example the first infeed station 301, to an outfeed station 4, for example the second outfeed station 402, wherein the first infeed station 301 and the second outfeed station 402 are offset from each other.

Objects 2 different from each other, received from the movement surface 101, can thus be sorted and/or separated to respective outfeed stations 4, in relation to the conveying trajectory set for each object 2. Moreover, each object 2 may also be rotated clockwise or anticlockwise about the vertical axis of the object 2, for varying the orientation of the object 2 moved before the outfeed station 4, if necessary.

It should be noted, therefore, that the movement apparatus 1 may perform a sorting function, if it is necessary to separate the objects 2, directing each towards specific outfeed stations 4 in relation to the properties of the object 2.

The control system is configured for identifying, between the movement cells 102, trajectory cells 105 belonging to the conveying trajectory and directing, in use, the direction of movement D of each trajectory cell 105 in the movement surface 101 in such a way as to move the object 1 in the conveying trajectory.

When, in use, the object 2 is in the conveying trajectory it is moved from the infeed station 3 to the outfeed station 4 in a conveying direction.

The trajectory cells 105 are, therefore, among all the movement cells 102 forming part of the movement surface 101, only those which act in conjunction with each other for moving the object 2 between the infeed station 3 and the outfeed station 4 established for the object 2, and identify in the movement surface 101 an area, not illustrated, intended for resting the lower surface of the object 2.

According to the invention, the control system is also configured for identifying, between the movement cells 102, convergence cells 106, defining at least one convergence zone 107 adjacent to the conveying trajectory.

The control system is configured to direct, in use, the direction of movement of each convergence cell 106, towards a central line T of the conveying trajectory to promote the maintaining of the object 2 inside the conveying trajectory.

It should be noted that in FIG. 3, which schematically represents the movement surface 101, each arrow represents the direction of movement D of a respective movement cell 102, or of a respective trajectory cell 105, or of a respective convergence cell 106 and that the conveying trajectory is the area between two lines, for example curved, in which the object 2 is intended to move. The central line T of the conveying trajectory is also a curved line, which represents a line of symmetry of the conveying trajectory.

It should be noted that, in FIG. 3, the numeral 102 denotes the movement cells which the control system has not defined either as trajectory cells 105 or convergence cells 106, since they do not participate in the movement of the object 2. The arrows indicating the movement cells 102 are illustrated in FIG. 3 with a continuous line.

The arrows indicating the trajectory cells 105 are shown with dashed lines, with a non-uniform type of dashed line, whilst the arrows indicating the convergence cells 106 are shown with dashed lines, with a uniform type of dashed line.

Thanks to the presence of convergence cells 106 in a convergence zone 107, positioned adjacent to the conveying trajectory, it is possible to correct a coming out of the object 2 from the conveying trajectory.

In fact, if, in use, the object 2 veers from the conveying trajectory and slides to its outside, as shown in FIG. 3 which shows a possible position for a veered object 2', the convergence cells 106 of the convergence zone 107 again direct the veered object 2' towards the conveying trajectory, thus annulling the veering.

The object 2, which falls within the conveying trajectory, may therefore reach the predetermined outfeed station 4, without the risk of reaching an incorrect outfeed station 4, or coming out and falling from the movement surface 101.

This makes it possible to have movement apparatuses 1 which are substantially immune to the disturbances, wherein even at a maximum movement speed which can be set up for the trajectory cells 105, there is a maximum correct movement efficiency of the objects 2. It is not, therefore, necessary to slow down the movement speed of the trajectory cells 105, in order to guarantee that the objects 2 remain resting on them from the infeed station 3 to the outfeed station 4.

For each convergence cell 106, the control system is configured for setting up a respective longitudinal component of the movement speed (which extends parallel to the longitudinal axis of extension Y of the movement surface 101) which is less than or equal to, a longitudinal component of the movement speed of a corresponding trajectory cell 105.

For each convergence cell 106, the control system is configured for setting up a respective transversal component of the movement speed, perpendicular relative to the longitudinal axis of extension Y, which is the maximum which can be reached.

In fact, each convergence cell 106 can be associated with a trajectory cell 105, which may be, for example, the one positioned along an axis, perpendicular to the longitudinal axis of extension Y and passing through the convergence cell 106; or which may be, for example, the one located at the minimum distance on the central line T of the conveying trajectory.

The maximum speed which can be reached means the maximum speed at which the convergence cell 106 may be set.

In other words, each movement cell 102 has a respective movement speed in the direction of movement D, which can be controlled independently relative to the other movement cells 102 and which may be less than, or equal to, a respective maximum speed, which is the maximum speed which can be reached.

The control system is configured for setting up, for each convergence cell 106, the respective transversal component of the movement speed, extending perpendicularly to the longitudinal axis of extension Y, which is equal to the above-mentioned maximum speed.

The control system can be configured to define the convergence zone 107 and a further convergence zone 107a, also comprising convergence cells 106, wherein the convergence zone 107 and the further convergence zone 107a are positioned on opposite sides of the conveying trajectory.

In this way, the return of the object 2 to the conveying trajectory is promoted both on one side and on the other of the conveying trajectory.

According to a version not illustrated, in addition, or alternatively relative to the presence of convergence zones opposite the conveying trajectory, the control system may be configured to detect the position of the object 2 in the conveying trajectory and define a convergence area (not illustrated), downstream of the object 2, and another convergence area (not illustrated) upstream of the object 2 in the conveying direction from the infeed station 3 to the outfeed station 4.

In the latter case, the control system may be configured for setting up a movement speed of the convergence cells 106 of the convergence area different to the movement speed of the convergence cells 106 of the other convergence area.

In particular, the movement speed of the trajectory cells 105 positioned at the object 2 may be greater than the movement speed of the convergence cells 106 of the convergence area, positioned downstream of the object, to slow down the convergence cells 106 of the convergence area.

At the same time, the movement speed of the trajectory cells 105 positioned at the object 2 may be less than the movement speed of the convergence cells 106 of the other convergence area, positioned upstream of the object 2, to accelerate the convergence cells 106 of the other convergence area.

In other words, this allows the convergence cells 106 downstream of the object 2 to be slowed down, whilst the convergence cells 106 upstream of the object are accelerated, to ensure that the object is braked in the case of veering downstream of the position of the object and, on the other hand, is accelerated in the case of veering upstream of the position of the object to promote the return of the object 2 to the conveying trajectory.

In order to detect the position of the object 2, the control system may comprise an image acquisition device configured to acquire, in use, a plurality of successive images of the movement surface 101 and a processing unit configured to process the images acquired and to check the position of the object 2 in the movement surface 101 at successive points in time, when the object 2 moves in the conveying trajectory.

However, the image acquisition device is not necessary.

In fact, alternatively, the position of the object can be detected, in use, by the control system performing a predictive processing since the processing unit can calculate the position of the object taking into account the instant in which the object 2 is received in the infeed station 3 and the movement speed of each trajectory cell 105 on which the object 2 is subsequently resting.

If the movement apparatus 1 receives two different objects 2 in the movement surface 101 from two respective infeed stations 3 and it must move them to two respective outfeed stations 4, the control system is configured to define two different conveying trajectories in the movement surface 101, each associated with a respective object 2 to be moved, and to identify, for each conveying trajectory, the respective trajectory cells 105 between the movement cells 102.

In the case of two objects to be moved simultaneously in the movement surface 101, the control system will define for each conveying trajectory, at least one respective convergence zone 107 associated with it.

In use, the movement method for objects 2 according to the invention comprises the steps of receiving at least one object 2 from an infeed station 3 and moving the object 2 towards an outfeed station 4. The movement method also comprises the steps of:

preparing a movement surface 101 comprising a plurality of movement cells 102 positioned on it in a matrix or chequerboard fashion;

controlling a direction of movement D of each movement cell 102 independently relative to the other movement cells 102, and operating the movement cells 102 in conjunction for moving the object 2 in succession;

defining a conveying trajectory in the movement surface 101 for conveying the object 2 from the infeed station 3 to the outfeed station 4.

Thanks to the control of each direction of movement and the cooperation between the movement cells 102, it is possible to transfer the object 2 to a predetermined position of the movement surface 101, irrespective of the dimensions, weight and features of the object 2, thereby guaranteeing a high flexibility in the possible movements in the movement surface.

The method also comprises the step of identifying, between the movement cells 102, trajectory cells 105 belonging to the conveying trajectory and directing a direction of movement D of each trajectory cell 105 in the movement surface 101 in such a way as to move the object 2 in the conveying trajectory.

In other words, the method comprises defining the conveying trajectory for the object 2 from the infeed station 3 to the outfeed station 4 and identifying, between all the movement cells 102 of the movement surface 101, those trajectory cells 105 which are involved in the conveying trajectory and for which it is necessary to suitably direct the direction of movement D so that the object 2 is moved in the conveying trajectory.

The movement method advantageously comprises the step of identifying, between the movement cells 102, convergence cells 106, defining at least one convergence zone 107 adjacent to the conveying trajectory and, for each convergence cell 106, directing the direction of movement D towards a central line T of the conveying trajectory to promote the maintaining of the object 2 inside the conveying trajectory.

Thanks to the identification of at least one convergence zone 107, comprising convergence cells 106, any uncontrolled deviations of the object 2 from the conveying trajectory are corrected for diverting it again so as to make it fall within the conveying trajectory.

It should be noted that defining both the convergence zone 107 and the conveying trajectory, before the object 2 is received in the infeed station 3, or also when the object 2 is already present in the movement surface 101, a condition of correction of the possible positioning of the object 2 in the movement surface 101 is always made active, which guarantees a high correction efficiency, if the object 2 were to veer.

The movement further comprises the step of controlling a movement speed in the direction of movement of each movement cell 102 independently from the others, and setting up, for each convergence cell 106, a respective longitudinal component of the movement speed, parallel to a respective longitudinal axis of extension Y of the movement surface 101, having a value less than, or equal to, a longitudinal component of a corresponding trajectory cell 105.

In fact, the movement method further comprises the step of associating with each convergence cell 106 at least one corresponding trajectory cell 105. The trajectory cell 105 associated with the convergence cell 106 may be that positioned, for example, along a transversal axis, perpendicular to the axis of longitudinal extension Y of the movement surface 101 and passing through the convergence cell 106.

Thanks to this association, an object 2' which has veered and which rests on the convergence cells 106, is moved in the conveying direction towards the outfeed station 4 with the same longitudinal speed as it would have had if it had been in the conveying trajectory.

The movement method also comprises the step of setting up, for each convergence cell 106, a respective transversal component of the movement speed, perpendicular to the longitudinal axis of extension Y, which is equal to the maximum speed which can be reached.

In other words, the method comprises the step of controlling the movement speed in the direction of movement of each movement cell 102 independently from the other movement cells 102, the movement speed of each movement cell 102 being less than, or equal to, a respective maximum speed, which is the maximum speed which can be reached; and also comprises the step of setting up, for each convergence cell 106, a respective transversal component of the movement speed, perpendicular to the axis of longitudinal extension Y which is equal to the above-mentioned maximum speed.

This favours the return of the veered object 2' into the conveying trajectory at the maximum possible speed.

The method also comprises the step of defining the convergence zone 107 and a further convergence zone 107a, on opposite sides of the conveying trajectory.

Alternatively, or in addition, the method comprises the step of detecting the position of the object 2 in the conveying trajectory and defining, in addition to the convergence zone 107, a convergence area downstream of the object 2 in the conveying direction in the conveying trajectory, and another convergence area, upstream of the object 2 in the conveying direction.

In fact, in addition to the convergence zone 107 initially associated with the convergence trajectory, it is possible to dynamically activate and deactivate a convergence area and another convergence area respectively downstream and upstream relative to the position of the object 2, as detected. This allows an even better control of the correction of any veering of the object 2 from the conveying trajectory, in real time relative to the position of the object 2.

The method also comprises the step of setting up a movement speed of the convergence cells 106 of the convergence area different from the movement speed of the convergence cells 106 of the other convergence area.

In particular, the method comprises the step of setting up the movement speed of the trajectory cells 105 at the object 2 which is greater than the movement speed of the convergence cells 106 of the convergence area and less than the movement speed of the convergence cells 106 of the other convergence area, to slow down the convergence cells 106 of the convergence area, downstream of the object 2, and accelerate the convergence cells 106 of the other convergence area, upstream of the object 2.

Dynamically, therefore, by defining the convergence area and the other convergence area in relation to the position of the object 2, the movement of the object 2 on the movement surface 101 may be, advantageously, further controlled.

It should be noted, therefore, that thanks to the movement apparatus 1 and the movement method according to the invention the maintaining of an object 2 inside the conveying trajectory is promoted, and the reliability of movement of each object 2 inside the conveying trajectory is improved without the need to slow down the objects 2, even in the presence of crossed and non-linear conveying trajectories.

The invention claimed is:

1. A method for moving objects (2) comprising the steps of receiving at least one object (2) from an infeed station (3) and moving the object (2) towards an outfeed station (4), further comprising the steps of:
preparing a movement surface (101) comprising a plurality of movement cells (102) positioned on it in a matrix or chequerboard fashion;
controlling a direction of movement of each movement cell (102) independently relative to the other movement cells (102), and operating the movement cells (102) in conjunction for moving the object (2) in succession;
defining a conveying trajectory in the movement surface (101) for conveying the object (2) from the infeed station (3) to the outfeed station (4);
identifying, between the movement cells (102), trajectory cells (105) belonging to the conveying trajectory and directing a direction of movement (D) of each trajectory cell (105) in the movement surface (101) in such a way as to move the object (2) in the conveying trajectory;
identifying, between the movement cells (102), convergence cells (106), defining at least one convergence zone (107) adjacent to the conveying trajectory and, for each convergence cell (106), directing the direction of movement (D) towards a central line (T) of the conveying trajectory to promote the maintaining of the object (2) inside the conveying trajectory;
controlling a movement speed in the direction of movement of each movement cell (102) independently from the other movement cells (102); setting up, for each convergence cell (106), a respective longitudinal component of the movement speed, parallel to a respective longitudinal axis of extension (Y) of the movement surface (101), having a value less than, or equal to, a longitudinal component of a corresponding trajectory cell (105).

2. The method according to claim 1, and comprising the step of associating with each convergence cell (106) at least one corresponding trajectory cell (105).

3. The method according to claim 1, and comprising the step of controlling a movement speed in the direction of movement of each movement cell (102) independently from the other movement cells (102), the movement speed of each movement cell (102) being less than, or equal to, a respective maximum speed; and further comprising the step of setting up, for each convergence cell (106), a respective transversal component of the movement speed, perpendicular to a respective longitudinal axis of extension (Z) of the movement surface (101), which is equal to the above-mentioned maximum speed.

4. The method according to claim 1, and comprising the step of defining the convergence zone (107) and a further convergence zone (107a), comprising respective convergence cells (106), on opposite sides of the conveying trajectory.

5. The method according to claim 1, and comprising the step of detecting the position of the object (2) in the conveying trajectory and defining a convergence area, downstream of the object (2) in a conveying direction in the conveying trajectory from the infeed station (3) to the outfeed station (4), and another convergence area, upstream of the object (2).

6. The method according to claim 5, and comprising the step of controlling a movement speed in the direction of movement of each movement cell (102) independently from the others; setting up a movement speed of the convergence cells (106) of the convergence area different to the movement speed of the convergence cells (106) of the other convergence area.

7. The method according to claim 6, and comprising the step of setting up the movement speed of the trajectory cells (105) at the object (2) which is greater than the movement speed of the convergence cells (106) of the convergence area and less than the movement speed of the convergence cells (106) of the other convergence area, to slow down the convergence cells (106) of the convergence area and accelerate the convergence cells of the other convergence zone.

\* \* \* \* \*